(12) United States Patent
Hadi

(10) Patent No.: US 11,897,349 B2
(45) Date of Patent: Feb. 13, 2024

(54) SOFT HITCH VEHICLE PLATOONING SYSTEM

(71) Applicant: DRiV Automotive Inc., Lake Forest, IL (US)

(72) Inventor: Rod Hadi, Grass Lake, MI (US)

(73) Assignee: DRiV Automotive Inc., Lake Forest, IL (US)

( * ) Notice: Subject to any disclaimer, the term of this patent is extended or adjusted under 35 U.S.C. 154(b) by 429 days.

(21) Appl. No.: 16/790,507

(22) Filed: Feb. 13, 2020

(65) Prior Publication Data

US 2020/0254892 A1 Aug. 13, 2020

Related U.S. Application Data

(60) Provisional application No. 62/804,934, filed on Feb. 13, 2019.

(51) Int. Cl.
*B60L 53/16* (2019.01)
*B60L 53/60* (2019.01)
*B60L 50/60* (2019.01)
*B60D 1/01* (2006.01)

(52) U.S. Cl.
CPC ........... *B60L 53/16* (2019.02); *B60D 1/01* (2013.01); *B60L 50/60* (2019.02); *B60L 53/60* (2019.02)

(58) Field of Classification Search
CPC .......... B60L 53/16; B60L 53/60; B60L 50/60; B60D 1/01; B62D 63/025; B62D 47/006
See application file for complete search history.

(56) References Cited

U.S. PATENT DOCUMENTS

| | | | |
|---|---|---|---|
| 7,850,191 B1 | 12/2010 | Kaminski et al. | |
| 8,100,426 B2 | 1/2012 | Kronenberg | |
| 8,738,196 B2 | 5/2014 | Kronenberg | |
| 9,423,794 B2 | 8/2016 | Lind et al. | |
| 2010/0044998 A1* | 2/2010 | Franchineau | B62D 47/025 280/491.1 |
| 2014/0188318 A1 | 7/2014 | Langgood et al. | |
| 2016/0052404 A1 | 2/2016 | Enomoto | |
| 2018/0022405 A1* | 1/2018 | Gecchelin | G05D 1/0088 701/23 |

(Continued)

FOREIGN PATENT DOCUMENTS

| | | |
|---|---|---|
| CN | 105197126 | 12/2015 |
| DE | 202012002846 | 9/2012 |
| FR | 2606354 | 2/1989 |

(Continued)

OTHER PUBLICATIONS

International Search Report for International Application PCT/US2020/018158, dated May 28, 2020.

*Primary Examiner* — David V Henze-Gongola
(74) *Attorney, Agent, or Firm* — Burris Law, PLLC

(57) ABSTRACT

A system includes a first hitch provided on a first vehicle and configured to connect to a second hitch provided on a second vehicle. The system includes a processor and a non-transitory computer-readable memory comprising instructions that are executable by the processor. The instructions include determining whether the first hitch is connected to the second hitch. The instructions include performing a charging control operation based on the determination of whether the first hitch is connected to the second hitch.

15 Claims, 5 Drawing Sheets

(56) References Cited

U.S. PATENT DOCUMENTS

2018/0201144 A1* 7/2018 Newman .................. B60D 1/62
2019/0315236 A1* 10/2019 Mere ....................... H02J 7/342

FOREIGN PATENT DOCUMENTS

| JP | 2001222790 | 8/2001 |
| JP | 2017517809 | 6/2017 |
| WO | 2018078625 | 5/2018 |

* cited by examiner

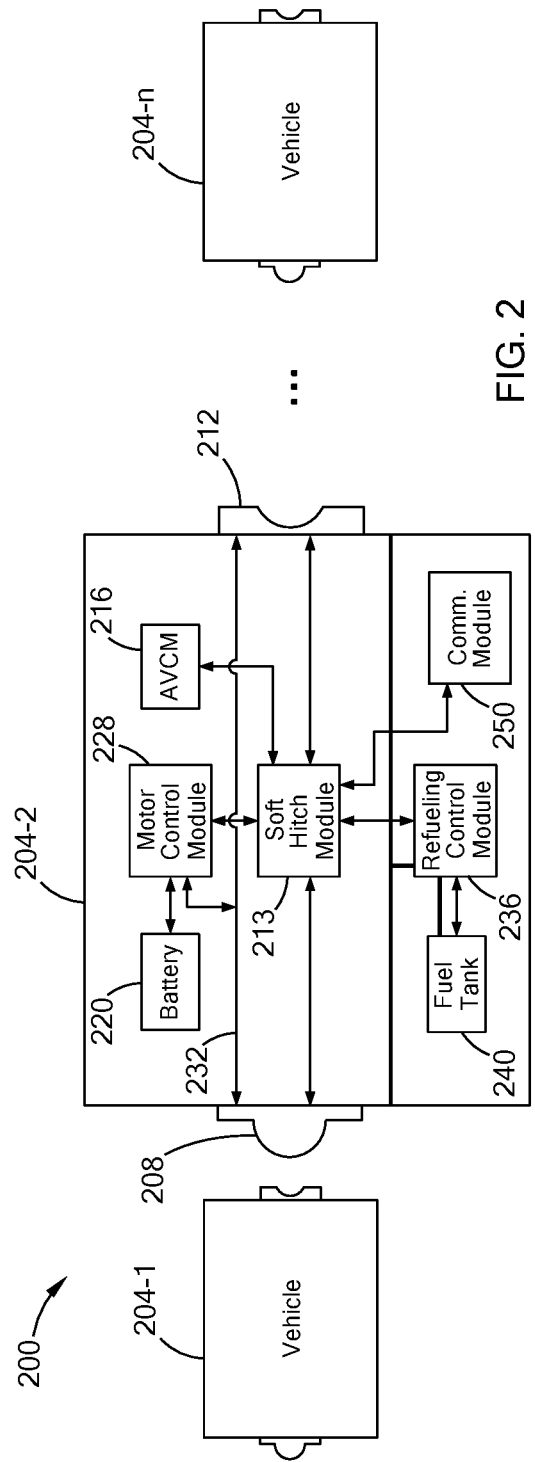
FIG. 2
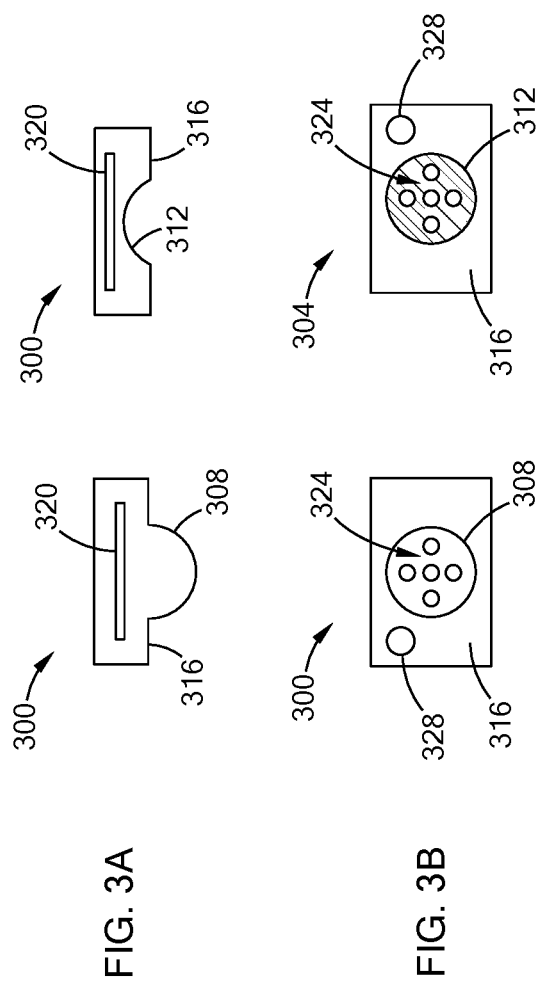
FIG. 3A
FIG. 3B

SOFT HITCH VEHICLE PLATOONING SYSTEM

CROSS-REFERENCE TO RELATED APPLICATIONS

This application claims the benefit of U.S. Provisional Application No. 62/804,934, filed on Feb. 13, 2019. The entire disclosure of the above application is incorporated herein by reference.

FIELD

The present disclosure relates to platooning control systems and methods for recharging and/or refueling vehicles.

BACKGROUND

The statements in this section merely provide background information related to the present disclosure and may not constitute prior art.

Vehicles (in particular, semi-trailer trucks and other long-haul vehicles) may be configured to travel over long distances in a platoon that includes two or more of the vehicles. In some examples, one or more of the vehicles in the platoon may have autonomous or semi-autonomous driving capabilities. For example, an autonomous vehicle may include one or more sensors such as cameras, laser sensors, radar sensors, among others. The sensors are arranged to sense objects such as other vehicles, road infrastructure and/or road hazards, lane markings, traffic signs and lights, among others. The autonomous vehicle is configured to travel on roadways in accordance with data collected via the sensors and/or additional data including, but not limited to, data from a global positioning system, driver inputs, data received from other vehicles, among others.

SUMMARY

This section provides a general summary of the disclosure and is not a comprehensive disclosure of its full scope or all of its features.

The present disclosure provides a system including a first hitch provided on a first vehicle and configured to connect to a second hitch provided on a second vehicle. The system includes a processor and a non-transitory computer-readable memory comprising instructions that are executable by the processor. The instructions include determining whether the first hitch is connected to the second hitch; and performing a charging control operation based on the determination of whether the first hitch is connected to the second hitch.

In some forms, the first hitch includes a first plurality of contact terminals arranged to contact a second plurality of contact terminals of the second hitch when the first hitch and the second hitch are connected.

In some forms, the first plurality of contact terminals includes at least one contact terminal that electrically couples to the second vehicle when the first hitch and the second hitch are connected.

In some forms, the first plurality of contact terminals includes at least one data terminal that communicatively couples to the second vehicle when the first hitch and the second hitch are connected.

In some forms, the first hitch includes a connection interface and a contact surface surrounding the connection interface.

In some forms, the connection interface includes a protruding portion configured to be received by the second hitch.

In some forms, the connection interface includes a concave receptacle configured to receive the second hitch.

In some forms, the contact surface is elastomeric.

In some forms, the first hitch includes a magnet and the first hitch and the second hitch are magnetically coupled via the magnet when the first hitch and the second hitch are connected.

In some forms, the instructions for performing the charging control operation comprises one of providing an electrical charge to the second vehicle from the first vehicle and providing the electrical charge to the first vehicle from the second vehicle.

In some forms, the instructions include: receiving a signal indicating an electrical charge associated with the second vehicle; determining whether the electrical charge is less than a threshold value; and in response to the electrical charge associated with the second vehicle being less than the threshold value, outputting a charge request signal to have the first vehicle selectively position the first hitch of the first vehicle such that a first battery of the first vehicle is electrically coupled to a second battery of the second vehicle.

In some forms, in response to the charge request signal, the first hitch of the first vehicle is selectively positioned such that the first hitch is provided within the second hitch of the second vehicle to connect the first hitch and the second hitch and electrically couple the first battery and the second battery.

In some forms, the instructions include: transmitting a charge request signal in response to an electrical charge of the first vehicle being less than a threshold value; and selectively positioning the first hitch of the first vehicle such that a first battery of the first vehicle is electrically coupled to a second battery of the second vehicle in response to receiving a verification from the second vehicle.

In some forms, in response to the charge request signal, the first hitch of the first vehicle is selectively positioned such that the first hitch is provided within the second hitch of the second vehicle to electrically couple the first battery and the second battery.

In some forms, the processor and the non-transitory computer-readable memory are located at a remote computing device in communication with the first vehicle and the second vehicle.

In some forms, the processor and the non-transitory computer-readable memory are located within the first vehicle.

The present disclosure provide a method for electrical charging moving vehicles by way of a first hitch and a second hitch, and the method includes acquiring a charge request signal from at least one of a first vehicle and a second vehicle, wherein the first hitch is provided on the first vehicle and the second hitch is provided on the second vehicle, and the first vehicle and the second vehicle are traveling along a road. The method also includes determining whether the first hitch is connected to the second hitch, wherein each of the first hitch and the second hitch includes a connection interface, a contact surface surrounding the connection interface, and a plurality of contact terminals, wherein the plurality of contact terminals of the first hitch and the plurality of contact terminals of the second hitch each include at least one contact terminal to electrically couple a first battery of the first vehicle and a second battery of the second vehicle when the first hitch and the second hitch are connected. The method also includes performing a charging control operation to electrically charge the first battery of the first vehicle or electrically charge the second battery of the second vehicle based on the charge request signal and the determination of whether the first hitch is connected to the second hitch.

In some forms, the charge request signal includes an electrical charge of the first battery of the first vehicle, and the method further comprises: determining whether the electrical charge of the first battery is less than a threshold value; acquiring a charge verification from the second vehicle in response to the electrical charge of the first vehicle being less than the threshold value; and selectively positioning the first hitch of the first vehicle such that the first battery of the first vehicle is electrically coupled to the second battery of the second vehicle in response to receiving the charge verification from the second vehicle.

In some forms, the charge request signal includes an electrical charge of the second battery of the second vehicle, and the method further comprises: determining whether the electrical charge of the second battery is less than a threshold value; and in response to the electrical charge of the second battery being less than the threshold value, outputting a charge request signal to have the first vehicle selectively position the first hitch of the first vehicle such that the first battery of the first vehicle is electrically coupled to a second battery of the second vehicle.

In some forms, the method further includes communicably coupling the first vehicle and the second vehicle when the first hitch and the second hitch are connected, wherein the plurality of contact terminals of the first hitch and the plurality of contact terminals of the second hitch each include at least one data terminal to exchange data.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is a functional block diagram of a soft hitch vehicle platooning system in accordance with the teachings of the present disclosure;

FIG. 3A illustrates a front soft hitch in accordance with the teachings of the present disclosure;

FIG. 3B illustrates a rear soft hitch in accordance with the teachings of the present disclosure;

Figure 1:
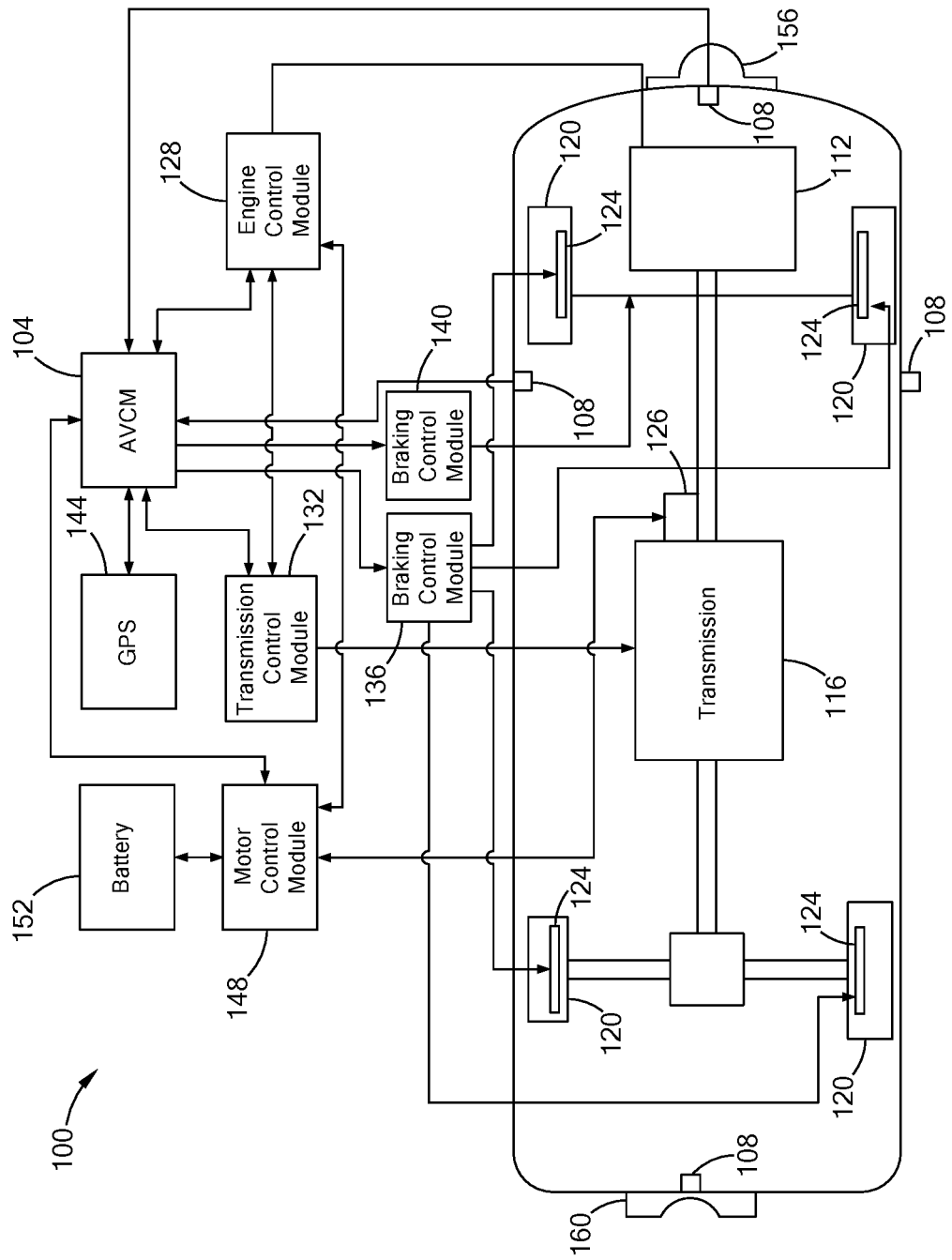
FIG. 1 is a functional block diagram of a vehicle in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

For fueled, electric, and hybrid electric vehicles, refueling stops and driver downtime increase the duration of long-distance travel. For example, although commercial vehicles such as semi-trailer trucks have relatively large fuel tanks (e.g., 100-150 gallons), refueling and driver downtime significantly increase travel time, and batteries of electric and hybrid electric vehicles must be recharged periodically.

Soft hitch vehicle platooning systems and methods according to the present disclosure reduce range anxiety and downtime associated with refueling and/or recharging and increase driver uptime. For example, some autonomous and/or semi-autonomous vehicles (collectively or individually referred to hereinafter as "autonomous" vehicles for simplicity) may be configured to implement a vehicle platooning scheme wherein one vehicle functions as a lead vehicle and one or more other vehicles are follower or trailing (hereinafter, "lag") vehicles. The lead vehicle may be driver-controlled and/or operated in accordance with semi-autonomous control supplemented by driver input. Conversely, the lag vehicles are configured to follow the lead vehicle in accordance with semi-autonomous control. The vehicles may be physically connected via a soft hitch connection as described below in more detail. Accordingly, drivers of the lag vehicles are able to take advantage of downtime while the driver of the lead vehicle controls and/or partially controls vehicle speed, steering, braking, among others.

Referring now to FIG. 1, an example vehicle 100 is shown. In some examples, the vehicle 100 has autonomous or semiautonomous driving capabilities. For example, the vehicle 100 includes an autonomous vehicle control module (AVCM) 104 configured to control one or more vehicle functions including, but not limited to, braking, steering, acceleration, transmission (i.e., gear shifting), among others, in accordance with signals received from one or more sensing devices, such as cameras, proximity sensors, lasers, among others. For simplicity, the sensing devices as described herein correspond to cameras such as cameras 108 arranged on a front, sides, rear, among others of a vehicle to detect objects (e.g., other vehicles). The cameras 108 generate images of the environment in the front, rear, and to the sides of the vehicle 100.

For example, the vehicle 100 includes systems including, but not limited to, an engine 112, transmission 116, wheels 120, and brakes 124. In some examples, the vehicle 100 may be a hybrid or non-hybrid electric (i.e., fully electric) vehicle including an electric motor 126. In a non-hybrid electric vehicle, the engine 112 may be omitted.

The AVCM 104 may selectively control systems of the vehicle 100 via respective control modules, including, but not limited to, an engine control module 128, a transmission control module 132, a braking control module 136, and a steering control module 140. In some examples, the vehicle 100 includes a global positioning system (GPS) 144 or other type of global navigation satellite system (GNSS) to determine a location of the vehicle 100. The AVCM 104 is configured to provide autonomous control of the vehicle 100 based on vehicle location data received from the GPS 144 in addition to signals received from the cameras 108, driver inputs, among others.

In a hybrid or non-hybrid electric vehicle, the motor 126 is mechanically coupled to the transmission 116 (via a shaft). A motor control module 148 controls functions related to applying power to the motor 126 from a battery 152 to cause the motor 126 to output torque for vehicle propulsion, selectively providing power from the motor 126 and/or other sources to charge the battery 152. For example, in a hybrid vehicle, under some circumstances, the motor control module 148 may disable power flow to the motor 126 and allow the transmission 116 to drive rotation of the motor 126. When driven by the transmission 116, the motor 126 generates power to recharge the battery 152. The motor control module 148 may also be responsive to and/or provide commands and data to the engine control module 128, the AVCM 104, among others.

The vehicle 100 according to the principles of the present disclosure implements a soft hitch system including a front hitch 156, a rear hitch 160, and a soft hitch module, as described below in more detail.

Referring now to FIG. 2, an example system 200 includes vehicles 204-1, 204-2, . . . , and 204-n, referred to collectively as vehicles 204. Each of the vehicles 204 may implement a soft hitch system including a front hitch 208, a rear hitch 212, and a soft hitch module 213. The rear hitch 212 of each of the vehicles 204 is configured to receive the front hitch 208 of another one of the vehicles 204 to form a soft physical connection between adjacent vehicles in a platoon. When connected, the vehicle 204-1 functions as a lead vehicle while the vehicles 204-2 . . . 204-n function as lag vehicles. For example, in one form, each of the vehicles 204 may include an AVCM 216 configured to provide autonomous control of the vehicles 204 such that the lag vehicles operate based on drive operations of the lead vehicle. That is, the lag vehicles may be configured to substantially match speeds, steer, brake, among other drive operations, in accordance with the lead vehicle to follow the lead vehicle. The AVCM 104 may be provided as the AVCM 216. While specific components are illustrated, the vehicles 204 may include other components such as those provided in vehicle 100.

In one form, the soft hitch module 213 is communicably coupled to the front hitch 208 and the rear hitch 212 and to communicate with relevant components of vehicle 204 including, but not limited to, the AVCM 216, the battery 220, a motor control module 228 that is similar to the motor control module 146, and a communication module 250. The various modules of the vehicles 204 may communicate with one another using vehicular networks such as but not limited to a controlled area network (CAN) and a local interconnect network (LIN). As described further herein, the soft hitch module 213 is configured to acquire data from other vehicles via the front hitch 208 and the rear hitch 212, performing a charge control operation based on an electric charge of a battery of another vehicle or its own battery 220.

Referring now to FIGS. 3A and 3B, an example configuration of a front hitch 300 and a rear hitch 304 are shown in a top-down and front view, respectively. The front hitch 300 and the rear hitch 304 may be provided as the front hitch 208 and the rear hitch 212 and are in communication with the soft hitch module 213. The front hitch 300 includes a connection interface 308 configured as a plug or other structure including a protruding portion and the rear hitch 304 includes a connection interface 312 configured as a socket or other concave receptacle arranged to receive the protruding portion of the connection interface 308. In another example, the connection interface 308 of the front hitch 300 may be configured as a receptacle and the connection interface 312 of the rear hitch 304 may be configured as a plug. That is, the connection interfaces 308 and 312 have a complementary shape to facilitate connection between the front hitch 300 and the rear hitch 304. In addition, the contour of the connection interfaces 308 and 312 may be configured in various suitable ways such as curved or round as shown, or, alternatively may be sloped or angled.

The connection interfaces 308 and 312 may be surrounded by respective contact surfaces 316. The contact surfaces 316 may be elastomeric to facilitate connection between the front hitch 300 and the rear hitch 304 and to absorb forces associated with contact between the respective vehicles. For example, the contact surfaces 316 may be configured to allow the vehicles to articulate relative to one another (e.g., during turning) while maintaining the soft hitch connection. In another example, the front hitch 300 and the rear hitch 304 may be connected to the respective vehicles via springs or another actuating structure to absorb contact forces and allow articulation.

In some examples, the front hitch 300 and rear hitch 304 include magnets 320 to magnetically couple the vehicles. In one form, the magnets 320 may correspond to high-powered electromagnets operable by the soft hitch module 213 to selectively generate a magnetic field to maintain connection between the vehicles and remove the magnetic field to release the connection between the vehicles. In another form, at least one of the magnets is a permanent magnet.

In one form, the front hitch 300 and rear hitch 304 include one or more complementary contact terminals 324 arranged to allow electrical connections (e.g., both data and charging power) between the vehicles. Although shown within the connection interfaces 308 and 312, in another form, one or more of the contact terminals 324 may be located outside of the connection interfaces 308 and 312 at the contact surfaces 316. When the front hitch 300 is connected to the rear hitch 304, at least one of the contact terminals 324 allows charging power (i.e., current) to flow from the rear hitch 304 of a lead vehicle to the front hitch 300 of a lag vehicle to charge a battery of the lag vehicle and/or vice versa. In some examples, at least one of the contact terminals 324 that allows the flow of electrical power may be extendable and retractable from the vehicle 204. One or more other contact terminals 324 may be configured as data terminals to allow the soft hitch modules 224 of the vehicles to exchange control data (e.g., speed, steering, and braking data). Along with control data, the soft hitch modules 213 may communicate other data such as, but not limited to, battery state of charge data, requests for charging, an indication that the connection is intact, among others. In some examples, the front hitch 300 and the rear hitch 304 may further include respective fuel ports 328 for allowing flow of fuel from a refueling (e.g., lead) vehicle to another (e.g., lag) vehicle.

With continuing reference to FIG. 2, in one form, the soft hitch modules 213 provided within the vehicles 204 may communicate with each other via the communication module 250 of respective vehicles 204. For example, the soft hitch modules may communicate charge requests, charge verifications, among others, as described below in further detail with reference to FIG. 4. The communication module 250 is configured to establish communication with various external devices such as other vehicles, remote computing device, roadside units, among others. In one form, the communication module 205 is configured to establish wireless communication links via cellular network, satellite network, dedicated short range communication (DSRC) system, among others, and may include electronic components such as transceivers, analog-to-digital converters, microprocessors for executing various protocols, among other electronic components.

In one form, with the soft hitch system of the present disclosure, each of the vehicles 204 may selectively charge a respective battery 220 via another vehicle 204. By way of explanation, one of the vehicles (e.g., the lead vehicle 204-1) may function as a charging vehicle to provide power via the soft hitch system to charge lag vehicle 204-2. For example, when a lag vehicle (e.g., vehicle 204-2) is connected to a lead vehicle (e.g., vehicle 204-1) having charging capabilities, the soft hitch module 213 of the lag vehicle may coordinate with the motor control module 228 to charge the battery 220 using power received from the lead vehicle 204-1. For example, in one form, the soft hitch module of the lead vehicle 204-1 notifies the motor control module of the lead vehicle that a connection has been formed between its rear hitch and the front hitch 208 of the lag vehicle 204-2. The motor control module of the lead vehicle 204-1 may then provide power from the battery of the lead vehicle 204-1 to the battery 220 of the lag vehicle 204-2 via the rear hitch of the lead vehicle 204-1, the front hitch 208 of the lag vehicle 204-2, and a charging bus 232 (e.g., a charging wiring harness) arranged to receive power via the front hitch 208. In a similar manner, the battery of the lead vehicle 204-1 may be charged by the battery 220 of the lag vehicle 204-2 via the charging bus 232 of the lag vehicle 204-2, the front hitch 208 of the lag vehicle 204-2, the rear hitch of the lead vehicle 204-1, and a charging bus of the lead vehicle.

In one form, the vehicle 204-2 may provide a pass-through connection between the lead vehicle 204-1 and another lag vehicle that is connected to the rear hitch 212 of the vehicle 204-2. Specifically, the charging bus 232 may provide a pass-through connection from the front hitch 208 to the rear hitch 212 to provide charging power to further lag vehicles in the platoon (e.g., the vehicle 204-n) via the rear hitch 212.

In examples where the vehicle 204-2 is a hybrid vehicle or non-hybrid vehicle that includes an internal combustion engine, the vehicle 204-2 may further include a refueling control module 236 and fuel tank 240. The soft hitch system may also include a fuel conduit 244 configured to receive fuel from the vehicle 204-1 via the front hitch 208. In some examples, the fuel conduit 244 may provide a pass-through connection from the front hitch 208 to the rear hitch 212 to provide fuel to further lag vehicles in the platoon (e.g., the vehicle 204-n) via the rear hitch 212. In this manner, the refueling control module 236 may be configured to selectively provide fuel to the fuel tank 240 from the fuel conduit 244. For example, the soft hitch module 213 may provide an indication to the refueling control module 236 that a connection has been formed between the front hitch 208 of the vehicle 204-2 and the rear hitch 210 of the vehicle 204-1. The refueling control module 236 may then control flow of fuel (e.g., using a pump, one or more valves, etc.) received from the vehicle 204-1 into the fuel tank 240. While the examples described herein illustrate the fuel conduit 244 configured to receive fuel from the vehicle 204-1 via the front hitch 208, it should be understood that various energy sources may be received from the vehicle 204-1 in other examples, such as natural gas, hydrogen gas, water, biofuels, and the like.

Figure 4:
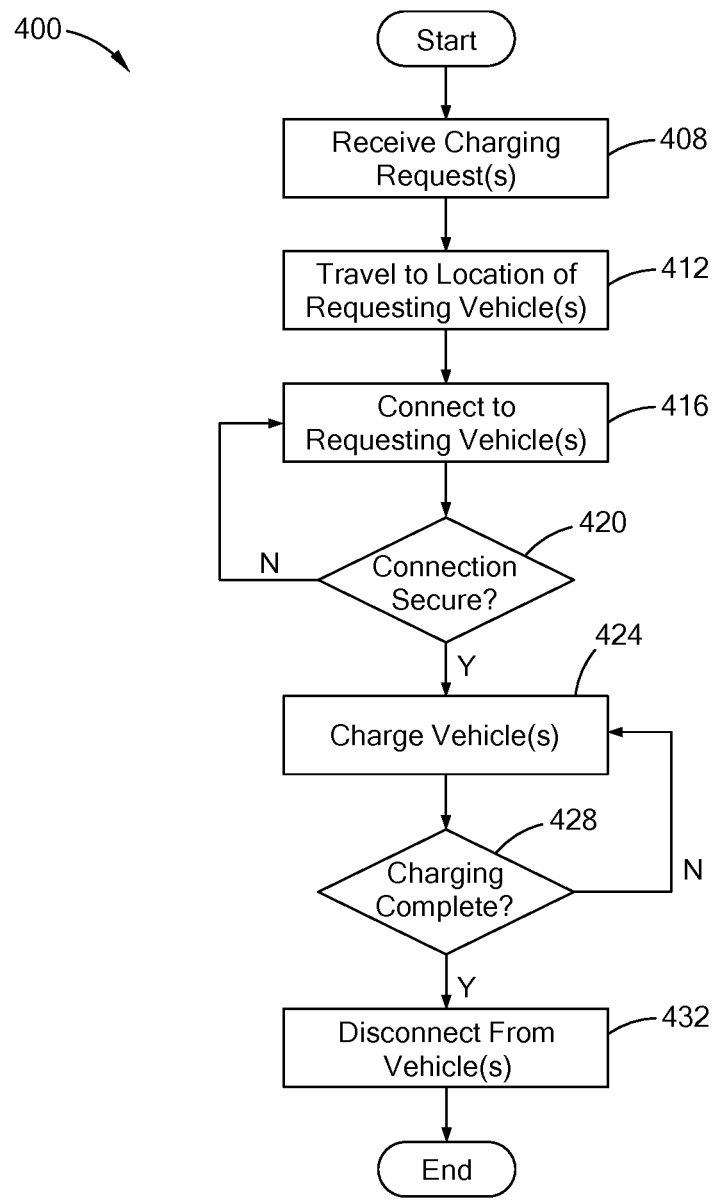
FIG. 4 illustrates an example control routine in accordance with the teachings of the present disclosure.

Referring now to FIG. 4, an example control routine 400 for processing a charge request by a soft hitch module is provided. In this example, a first vehicle and a second vehicle both have a soft hitch system of the present disclosure. The control routine 400 is described from the perspective of the first vehicle and the first vehicle may be referred to as a charging vehicle and the second vehicle may be referred to as the requesting vehicle. At 408, the soft hitch module of the first vehicle receives a charge request signal from the second vehicle that is traveling individually along a road. In one form, the charge request signal includes an electrical charge associated with a battery of the requesting vehicle (e.g., the second vehicle) and the requesting vehicle may automatically transmit the charge request signal to another vehicle (e.g., a first vehicle or a charging vehicle) when the electrical charge of its battery is less than a threshold value. The threshold value may be determined by the vehicle manufacturer.

In one form, upon receiving the charge request signal, the soft hitch module of the first vehicle determines whether its battery has sufficient electrical charge to charge the second vehicle, and if so may transmit a charge verification to the soft hitch module of the second vehicle to indicate that the first vehicle can charge the second vehicle. In one form, the charge verification may indicate that the electrical charge of the battery of the first vehicle, the electrical charge of the battery of the second vehicle, whether the electrical charge of the battery of the second vehicle is less than the electrical charge of the battery of the first vehicle by a threshold amount, or a combination thereof. In one variation, the requesting vehicle and/or charging vehicle may automatically transmit the charge request signal when the requesting vehicle is within a predetermined distance of a charging vehicle. In another variation, the first vehicle and the second vehicle may periodically exchange data indicative of the electrical charge of respective batteries, and the first vehicle may transmit a charge request signal to the second vehicle when the electrical charge of the battery of the second vehicle is less than a threshold value and/or is less than the electrical charge of the battery of the first vehicle.

At 412, the charging vehicle travels to the location of the requesting vehicle. For example, the charging vehicle may already be travelling in the same area as the requesting vehicle or at a charging station near the requesting vehicle. At 416, the charging vehicle and/or requesting vehicle selectively position a corresponding hitch such that the charging vehicle is electrically connected to the requesting vehicle via the soft hitch system described above. In one form, the soft hitch module of the charging vehicle communicates with one or more other modules within the charging vehicle to selectively position the corresponding hitch by adjusting (e.g., reducing or increasing) the speed of the charging vehicle such that the distance between the charging vehicle and requesting vehicle is reduced to connect the hitches. Furthermore, the speed of the requesting vehicle may also be adjusted until the respective hitches are connected. In some examples, the charging vehicle can selectively position the corresponding hitch to form the electrical connection by maintaining a current speed of the charging vehicle, and the requesting vehicle can selectively position the corresponding hitch to form the electrical connection by adjusting the speed of the requesting vehicle, thereby reducing the distance between the charging vehicle and requesting vehicle. In some examples, the selective positioning of the hitches may be executed under autonomous control, driver control, or a combination thereof. The charging vehicle may connect to a front hitch or a rear hitch of the requesting vehicle or a rear of the requesting vehicle. In the event the requesting vehicle is part a platoon, the charging vehicle may couple to the platoon and use vehicles between the charging vehicle and requesting vehicle as a conduit to the charging vehicle.

At 420, the soft hitch module of the first vehicle determines whether respective hitches of the first vehicle and the second vehicle are connected and secure. For example, the soft hitch module 213 may receive a signal (e.g., via the contact terminals 324) only when the complementary contact terminals 324 of the front hitch 300 and the rear hitch 304 are in contact with one another. A similar connection validation may also be performed by the second vehicle. If connected and secure, the soft hitch module of the first vehicle performs a charging control operation to charge the battery of the second vehicle at 424.

Specifically, in one form, the soft hitch module of the first vehicle communicates with the motor control module of the first vehicle to begin charging the battery of the second vehicle using power from the battery of the first vehicle. For example, the motor control module receives an indication from the soft hitch module that the connection is secure and closes a switch to allow charging power to flow from the battery to the front/rear hitch of the first vehicle to the rear/front hitch of the second vehicle and ultimately to the battery of the second vehicle. At 428, the soft hitch module determines whether charging is complete based on an electrical charge of the battery of the second vehicle or the electrical charge of the battery of the first vehicle. If complete, the soft hitch module, at 432, notifies the motor control module to halt charge operation and communicates with one or more modules of the first vehicle to selectively disconnect from the second vehicle. In one variation, prior to disconnecting, the soft hitch module may transmit a charge completion signal to the soft hitch module of the second vehicle and the second vehicle may selectively disconnect from the first vehicle. It should be readily understood that FIG. 4 illustrates one control routine for performing a charge control operation between vehicles having the soft hitch system of the present disclosure.

Figure 5:
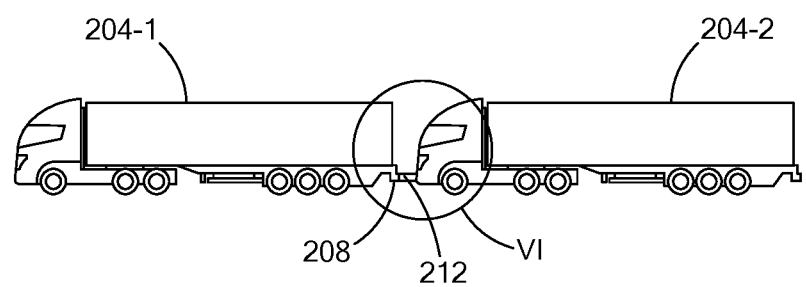
FIG. 5 shows a first vehicle and a second vehicle that are connected using the soft hitch in accordance with the teachings of the present disclosure.
Figure 6:
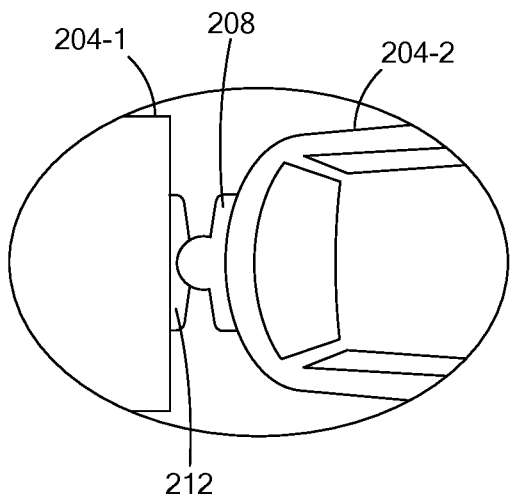
FIG. 6 shows a top view of a first vehicle and a second vehicle that are connected using the soft hitch in accordance with the teachings of the present disclosure.

The soft hitch system of the present disclosure facilitates a soft physical connection between adjacent vehicles traveling as part of platoon. Referring to FIGS. 5 and 6, the rear hitch 212 of vehicle 204-1 receives the front hitch 208 of vehicle 204-2 to form the soft physical connection. Once connected, the vehicles 204 may travel as a platoon and/or charge one another in the event an electrical charge of a battery is below a threshold.

Figure 7:
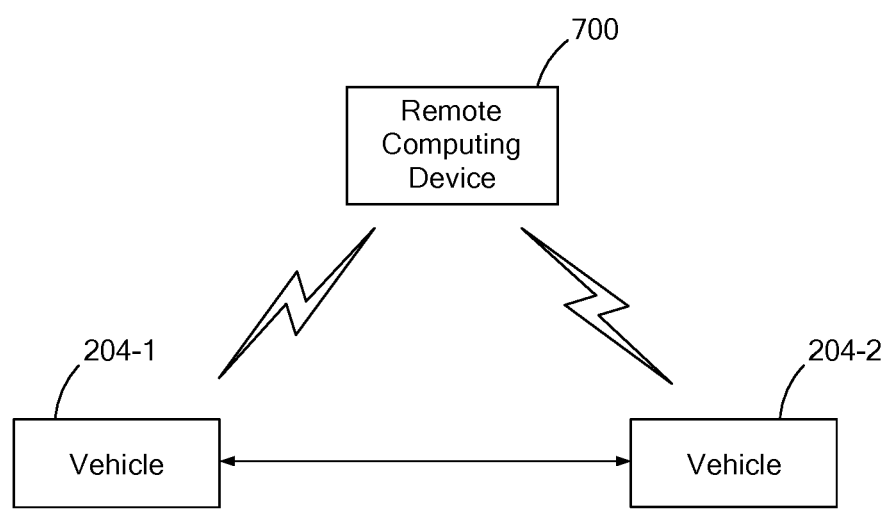
FIG. 7 is a functional block diagram of a soft hitch vehicle platooning system including a remote computing device in accordance with the teachings of the present disclosure.

While the examples described herein illustrate the soft hitch modules provided within the vehicles for facilitating charge operations, it should be understood that certain functions of soft hitch control modules may be transferred to a remote computing device that is communicatively coupled to vehicles having the soft hitch system. By way of explanation, FIG. 7 illustrates a functional block diagram of a soft hitch vehicle platooning system including a remote computing device 700. In this example, the vehicles 204-1 and 204-2 may periodically exchange data such as location, electrical charge, destination, travel route, among others, to the remote computing device 700. The remote computing device 700 is configured to use the data obtained to: form a platoon based on travel route of the vehicles 204 and instruct the vehicles 204 to hitch together to form the platoon; request vehicle 204-1 to charge vehicle 204-2 or vice versa; and/or direct another vehicle to one of the vehicles 204 to charge the battery of the vehicle 204. More particularly, in one form, the remote computing device 700 may be configured to execute some of the steps of routine 400 described above with reference to FIG. 4. For example, the remote computing device 700 may receive the one or more charge request signals requests for receiving electrical charging from one of the vehicles 204 travelling individually and/or in a platoon along a road and the charge verifications (i.e., step 408 of control routine 400) and may forward a charge request signal to the other vehicle 204 to have the other vehicle 204 charge the requesting vehicle 204. As another example, the remote computing device 700 may determine whether the vehicles 204 are sufficiently charged (i.e., step 428 of control routine 400) based on data received from the vehicles and then have a vehicle with insufficient charge transmit a charge request signal to an identified vehicle with sufficient charge. To execute the functionality described herein, the remote computing device 700 may include various electronic components such as one or more processors configured to execute instructions stored in a nontransitory computer-readable memory, such as a random-access memory (RAM) and/or read-only memory (ROM), and transceivers for establishing wireless communication with the vehicles 204. While specific operations are provided, the remote computing device may be configured to perform other suitable operations.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or computing device may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable memory. The term computer-readable memory, as used herein, does not encompass transitory electrical or electromagnetic signals propagating through a medium (such as on a carrier wave); the term computer-readable memory may therefore be considered tangible and non-transitory.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

Although the terms first, second, third, etc. may be used to describe various elements and/or components, these elements and/or components, should not be limited by these terms. These terms may be only used to distinguish one element and/or component from another element and/or component. Terms such as "first," "second," and other numerical terms when used herein do not imply a sequence or order unless clearly indicated by the context. Thus, a first element could be termed a second element, without departing from the teachings of the example forms.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

What is claimed is:

1. A system comprising:
   a first hitch provided on a first vehicle and configured to connect to a second hitch provided on a second vehicle;
   a first soft hitch module disposed in the first vehicle; and
   a second soft hitch module disposed in the second vehicle, wherein the first soft hitch module and the second soft hitch module communicate with each other, each of the first and second soft hitch comprising a processor, and a non-transitory computer-readable memory comprising instructions that are executable by the processor, wherein the instructions include:
   transmitting, by the second soft hitch module, a charge request signal when an electrical charge of the second vehicle is less than a threshold;
   receiving, by the first soft hitch module, the charge request signal;
   transmitting, by the first soft hitch module, a charge verification signal to the second soft hitch module when the first vehicle and the second vehicle are disconnected and moving within a threshold distance;
   positioning the first hitch relative to the second hitch to allow the first hitch to be connected to the second hitch when the first and second vehicles are moving;
   determining whether the first hitch is connected to the second hitch;
   performing, by the first soft hitch module, a charging control operation based on the determination of whether the first hitch is connected to the second hitch when the first and second vehicles are moving.

2. The system of claim 1, wherein the first hitch includes a first plurality of contact terminals arranged to contact a second plurality of contact terminals of the second hitch when the first hitch and the second hitch are connected.

3. The system of claim 2, wherein the first plurality of contact terminals includes at least one contact terminal that electrically couples to the second vehicle when the first hitch and the second hitch are connected.

4. The system of claim 2, wherein the first plurality of contact terminals includes at least one data terminal that communicatively couples to the second vehicle when the first hitch and the second hitch are connected.

5. The system of claim 1, wherein the first hitch includes a connection interface and a contact surface surrounding the connection interface.

6. The system of claim 5, wherein the connection interface includes a protruding portion configured to be received by the second hitch.

7. The system of claim 5, wherein the connection interface includes a concave receptacle configured to receive the second hitch.

8. The system of claim 5, wherein the contact surface is elastomeric.

9. The system of claim 1, wherein the first hitch includes a magnet and the first hitch and the second hitch are magnetically coupled via the magnet when the first hitch and the second hitch are connected.

10. The system of claim 1, wherein the instructions for performing the charging control operation comprises providing the electrical charge to the second vehicle from the first vehicle.

11. The system of claim 1, wherein in response to the charge request signal, the first hitch of the first vehicle is selectively positioned such that the first hitch is provided within the second hitch of the second vehicle to connect the first hitch and the second hitch and electrically couple a first battery of the first vehicle and a second battery of the second vehicle.

12. The method of claim 1, wherein the charge request signal is transmitted from the second soft hitch module directly to the first soft hitch module.

13. The method of claim 1, wherein the charge verification signal is transmitted from the first soft hitch module to the second soft hitch module upon receipt of the charge request signal by the first soft hitch module.

14. A method for electrical charging moving vehicles by way of a first hitch and a second hitch, the method comprising:

- transmitting, by a second soft hitch module of a second vehicle, a charge request signal when an electrical charge of the second vehicle is less than a threshold and when the second vehicle is moving;
- acquiring, by a first soft hitch module of a first vehicle, the charge request signal when the first vehicle and the second vehicle are moving, wherein the first hitch is provided on the first vehicle and the second hitch is provided on the second vehicle;
- transmitting, by the first soft hitch module, a charge verification signal to the second soft hitch module when the first vehicle and the second vehicle are disconnected and moving within a threshold distance;
- positioning the first hitch relative to the second hitch to allow the first hitch to be connected to the second hitch when the first and second vehicles are moving;
- determining whether the first hitch is connected to the second hitch, wherein each of the first hitch and the second hitch includes a connection interface, a contact surface surrounding the connection interface, and a plurality of contact terminals, wherein the plurality of contact terminals of the first hitch and the plurality of contact terminals of the second hitch each include at least one contact terminal to electrically couple a first battery of the first vehicle and a second battery of the second vehicle when the first hitch and the second hitch are connected; and
- performing, by the first soft hitch module, a charging control operation when the first hitch is connected to the second hitch and when the first and second vehicles are moving.

15. The method of claim 14 wherein the plurality of contact terminals of the first hitch and the plurality of contact terminals of the second hitch each include at least one data terminal to exchange data.

\* \* \* \* \*